United States Patent [19]
Rabe

[11] Patent Number: 5,244,625
[45] Date of Patent: Sep. 14, 1993

[54] METHOD FOR MANUFACTURING A POLYMERIC CAGE

[75] Inventor: Jürgen Rabe, Talblick, Fed. Rep. of Germany

[73] Assignee: Ina Walzlager Schaeffler KG, Fed. Rep. of Germany

[21] Appl. No.: 450,619

[22] Filed: Dec. 14, 1989

[30] Foreign Application Priority Data

Jan. 3, 1989 [DE] Fed. Rep. of Germany ....... 3900068

[51] Int. Cl.$^5$ ..................... B29C 49/04; B29C 49/48; B29C 49/72
[52] U.S. Cl. .................... 264/527; 264/523; 264/536; 264/540; 425/525; 425/527
[58] Field of Search ............... 264/536, 540, 523, 527, 264/242; 425/525, 527, 532

[56] References Cited

U.S. PATENT DOCUMENTS

| | | | |
|---|---|---|---|
| 3,263,009 | 7/1966 | Vidal | 264/536 |
| 3,432,586 | 1/1969 | Stenger | 264/536 |
| 3,862,698 | 1/1975 | Hafele | 264/536 |
| 4,397,802 | 8/1983 | Ernst et al. | 264/267 |
| 4,497,521 | 2/1985 | Lowery | 384/544 |
| 4,781,877 | 11/1988 | Rabe | 264/242 |

FOREIGN PATENT DOCUMENTS

| | | | |
|---|---|---|---|
| 1101855 | 10/1955 | France | 264/242 |
| 399668 | 11/1942 | Italy | 264/242 |
| 113842 | 6/1942 | Sweden | 264/242 |

OTHER PUBLICATIONS

B. T. Morgan, Blow Molding, Plastics Engineering Handbook, 1976, p. 326.

Primary Examiner—Catherine Timm
Attorney, Agent, or Firm—Bierman and Muserlian

[57] ABSTRACT

A method for manufacturing a cage of a polymeric material for a radial rolling bearing with two end rings formed at the cage and arranged at a distance to each other in the axial direction and crossbars spaced behind one another in the peripheral direction connecting the end rings and forming pockets for receiving rolling elements, each crossbar being formed by two relatively thin-walled crossbar walls delimiting the neighboring pockets and a connecting section situated between the crossbar walls, and a device for executing the method.

5 Claims, 4 Drawing Sheets

5,244,625

METHOD FOR MANUFACTURING A POLYMERIC CAGE

STATE OF THE ART

A method for manufacturing a cage of a polymeric material for a radial rolling bearing with two end rings formed at the cage and arranged at a distance to each other in the axial direction and crossbars spaced behind one another in the peripheral direction connecting the end rings and forming pockets for receiving rolling elements, each crossbar being formed by two relatively thin-walled crossbar walls delimiting the neighboring pockets and a connecting section situated between the crossbar walls and a device for executing the method are known. A rolling bearing cage described in DE-GM 8,329,410 is manufactured by casting or injection using a mold with radial slides to form it. In this cage, retaining projections at the crossbars which delimit the pockets for the rolling elements have to yield elastically so that the pockets are not over-stretched when, after casting or injection, the radial slides are pulled and the rolling elements are inserted.

Rolling bearing cages manufactured by several pin-point or tunnel, and in special cases, also by fan gate systems by the injection molding process have the following disadvantages. They have solid cross-sections which cause high material consumption and as a result of the large wall thicknesses, long cooling and cycle times are necessary. The different gate types always lead to the formation of joint lines and junction locations which are weak points in the finished component.

OBJECTS OF THE INVENTION

It is an object of the invention to provide a method and a device which make it possible to avoid these disadvantages and manufacture cages without weak points to provide a rolling bearing cage of high strength and low material requirement which has no joint lines or junction locations whatever.

This and other objects and advantages of the invention will become obvious from the following detailed description.

THE INVENTION

The method of the invention for manufacturing a cage of a polymeric material for a radial rolling bearing with two end rings formed at the cage and arranged at a distance to each other in the axial direction and crossbars spaced behind one another in the peripheral direction connecting the end rings and forming pockets for receiving rolling elements, each crossbar being formed by two relatively thin-walled crossbar walls delimiting the neighboring pockets and a connection section situated between the crossbar walls, is characterized in that a tube of a polymeric material is inserted into an open, axially symmetrical hollow mold which, for the formation of the pockets delimited by the crossbar walls and of the connecting sections, contains projections extending radially inwards and shaped surfaces extending in the peripheral direction, which surfaces are situated in each case between two neighboring projections, the hollow mold is closed and the tube is pressed in the hot plastic condition radially into the surrounding hollow mold by inflation with a certain internal tube pressure, a cage profile thus being formed with axially adjoining, non-deformed sections of the tube and with extensions which connect the two crossbar walls of a pocket and close the same, the cage profile is cooled in the hollow mold, the hollow mold is opened and the cage profile with the non-deformed sections and the extensions is removed from the mold and the non-deformed sections and the extensions are removed from the cage profile.

The tube may be made by extrusion so that its capacitive heat is utilized for maintaining the hot plastic condition which is necessary for the deformation by inflation in the hollow mold which follows immediately thereafter. Thus, a tube as the initial work piece is pressed radially from inside into a hollow mold which surrounds it so that a cage profile with small wall thickness results. In medium-sized cages, material savings of up to 50% can be attained because the extensions and non-deformed sections which are subsequently removed can be fed back into the manufacturing process. By reason of this processing technology and as a result of the small wall thickness, a reduction of the manufacturing time by at least 50% as against conventional rolling bearing cages can be obtained in the case of medium-sized cages. During the inflation procedure, retaining projections for the rolling elements can be formed at cross-bar walls of the cage which delimit the pockets for the rolling elements in the peripheral direction.

The method of the invention is particularly economical if several cage profiles are formed one behind the other in the axial direction at the same time out of one tube. Even the tube sections which remain between two neighboring cage profiles can be fed back into the manufacturing process after the edge trimming of the cage profiles which can be done fully automatically.

In a device of the invention for carrying out the method, several identical, shaped surfaces and projections extending inwards are formed in an axially symmetrical hollow mold behind one another in the peripheral direction and alternate with each other, at least the projections being radially displaceably arranged. This device makes an unproblematic removal of the formed cage profile possible after the projections have been radially withdrawn from the cage pockets. The axially central region of the hollow mold can be made up of several identical, radially displaceable segment pieces arranged along a closed circular periphery, at each of which segments a projection with two adjoining shaped-surface parts is formed so that at the radial withdrawal of the segment pieces already, almost the entire cage profile is removed from the mold.

For a particularly economical production, several groups of segment pieces can be arranged at the hollow mold spaced behind one another in the axial direction, each one being arranged along a closed circular periphery so that several cage profiles are formed at the same time with one hollow mold.

Referring now to the drawings.

Figure 2:
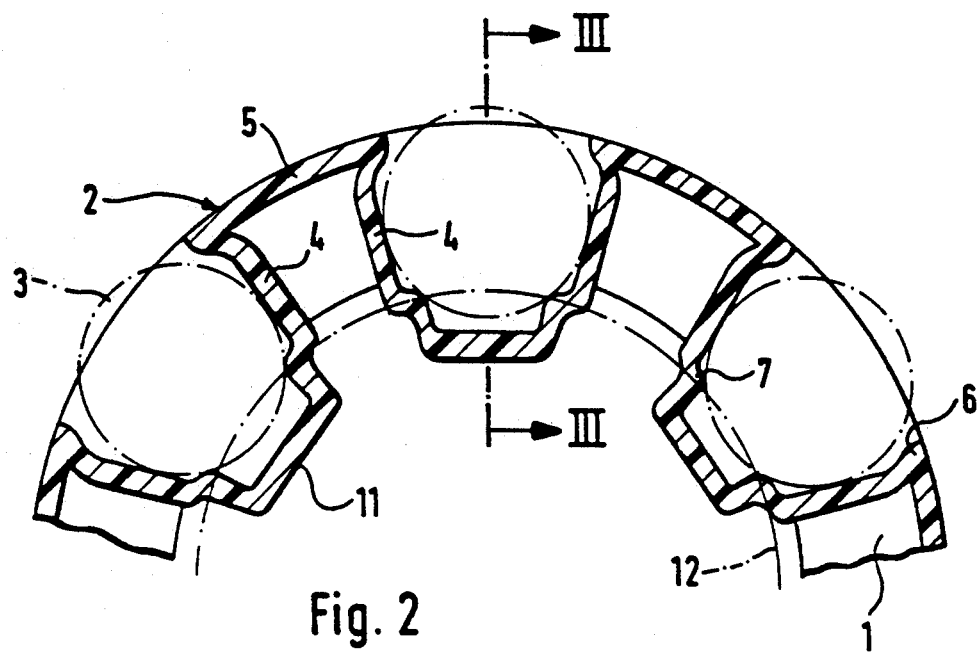
FIG. 2 is a radial section through the cage profile along line II—II of FIG. 1 with crossbar walls connected to each other by extensions.

A rolling bearing cage made by the method of the invention is made according to FIGS. 1 to 4 as a one-piece component of a polymeric material with two parallel end rings 1 and several crossbars 2 parallel to the cage axis, which crossbars connect the end rings 1 with each other and are arranged behind one another in the peripheral direction to form pockets for receiving rolling elements 3. In the axial section of the cage, each crossbar is U-shaped and comprises two relatively thin crossbar walls 4 and a likewise thin-walled connecting section 5 by which the crossbar walls 4 are connected with each other at the outer side of the cage. The crossbar 2 is arranged in such a way that it is open towards the inner side of the cage with its U-shape. In the pockets, retaining projections 6 and 7 for the inserted rolling elements 3 are formed at the crossbar walls 4. In the axial section, the end rings 1 look U-shaped and comprise an inner arm 8 and an outer arm 9 which, with their free ends are likewise directed toward the inner side of the cage.

According to the method of the invention for the production of the cage, a tube made of a polymeric material as initial work piece is inserted into a hollow mold and subjected to an internal pressure after having been previously brought into the hot plastic condition so that the material gets transported into the mold surrounding the tube. If several cages are made in this way at the same time out of one tube, several cage profiles made up of end rings 1 and crossbars 2 are formed behind one another on the tube length between which cage profiles undeformed tube sections 10 remain. These are then separated from the cage profiles.

Besides this, during the deformation, as a result of the internal tube pressure, extensions 11 are formed at each cage profile which connect two crossbar walls 4 with each other in the region of a pocket for rolling element 3. At each cage profile, these extensions 11 are severed along a separating circle 12 extending slightly inwards of the projections 7 which can be done by punching, cutting or shearing. The severed extensions 11 and the tube sections 10 can be fed back into the manufacturing process.

Figure 1:
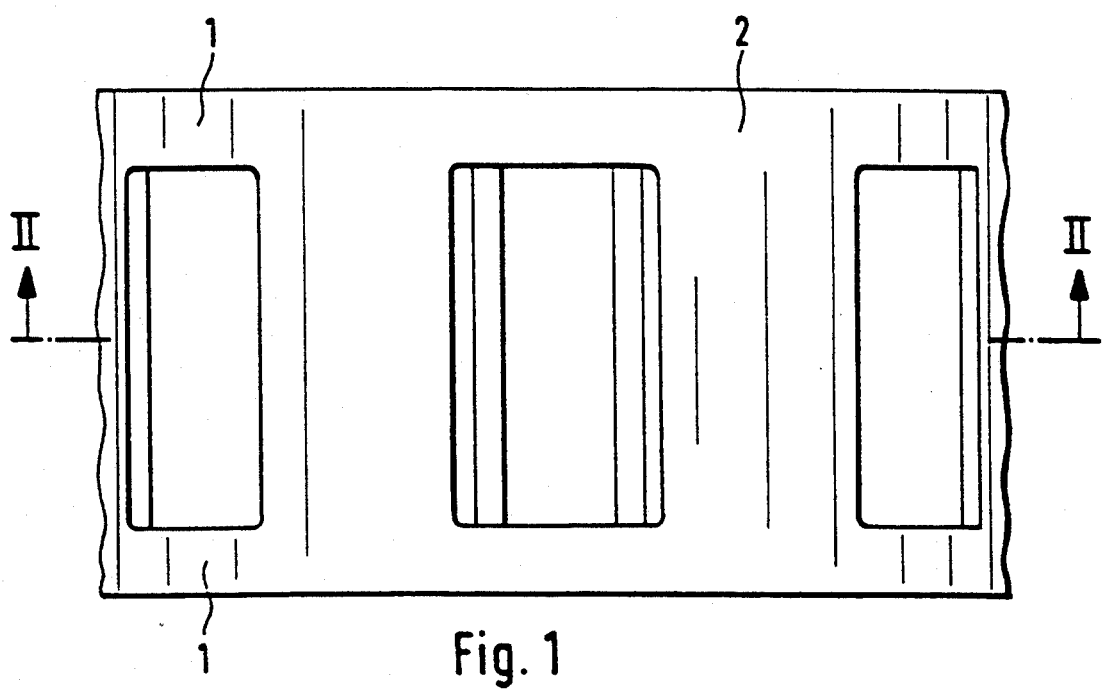
FIG. 1 is a part of a cage profile made by the method of the invention in a radial outer view.
Figure 3:
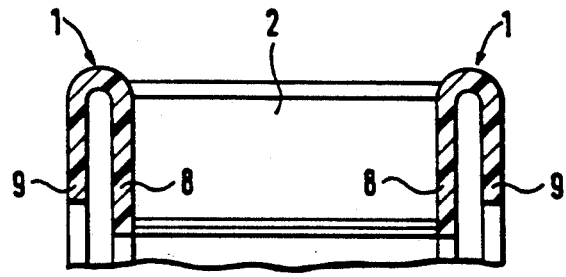
FIG. 3 is an axial section through the cage along line III—III of FIG. 2 after the removal of the extensions from the inner sides of the crossbar walls.
Figure 4:
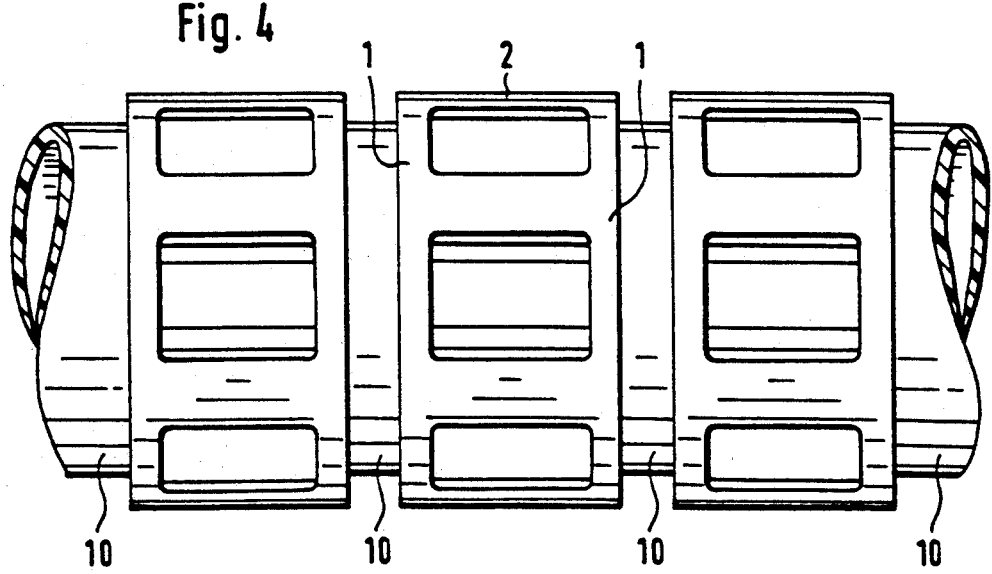
FIG. 4 is a rotationally symmetrical hollow body with three identical cage profiles formed from one tube before the removal of the tube sections between them on a reduced scale.
Figure 5:
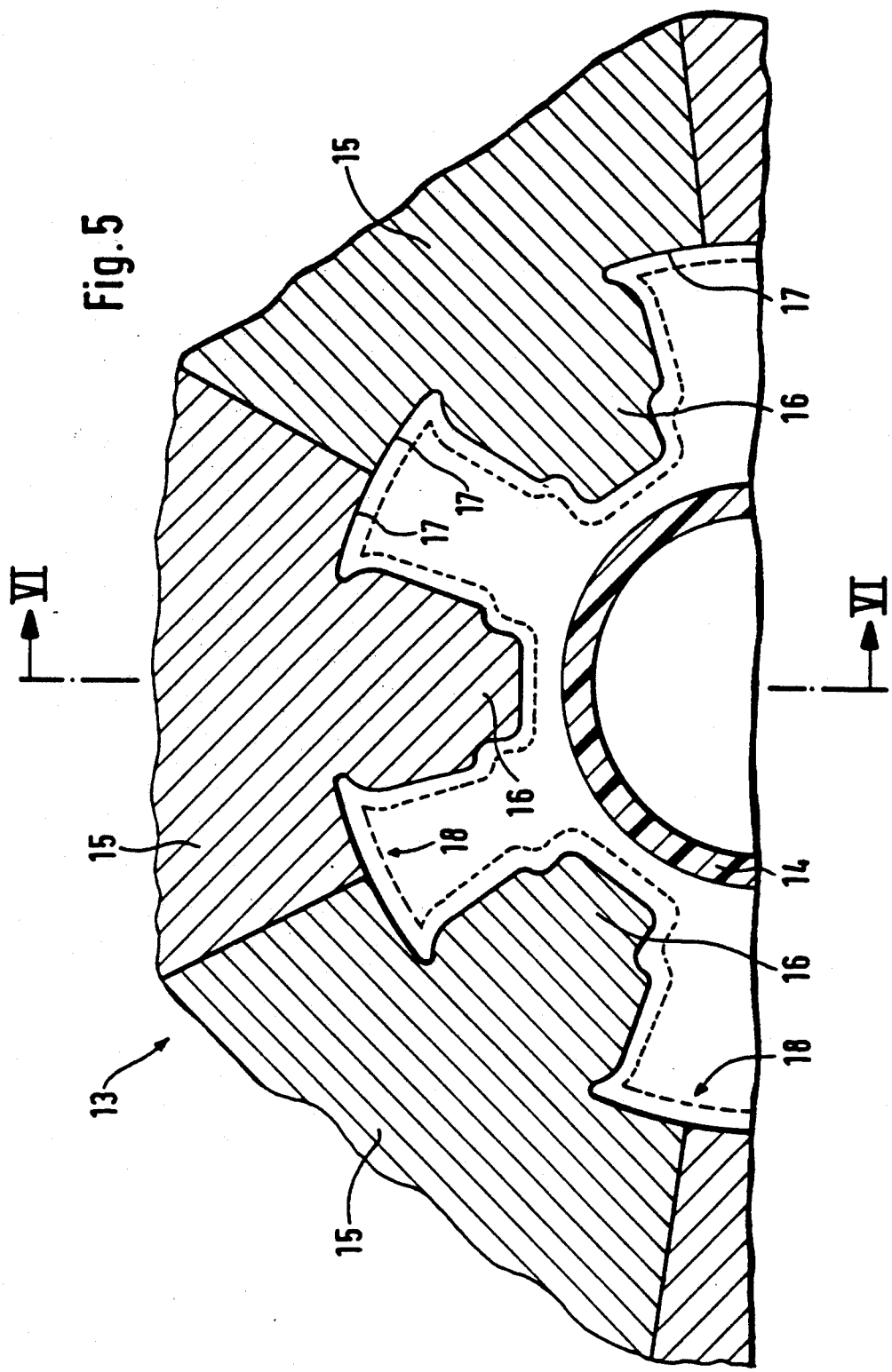
FIG. 5 is a radial section of a part of the device of the invention for the production of the cage.
Figure 6:
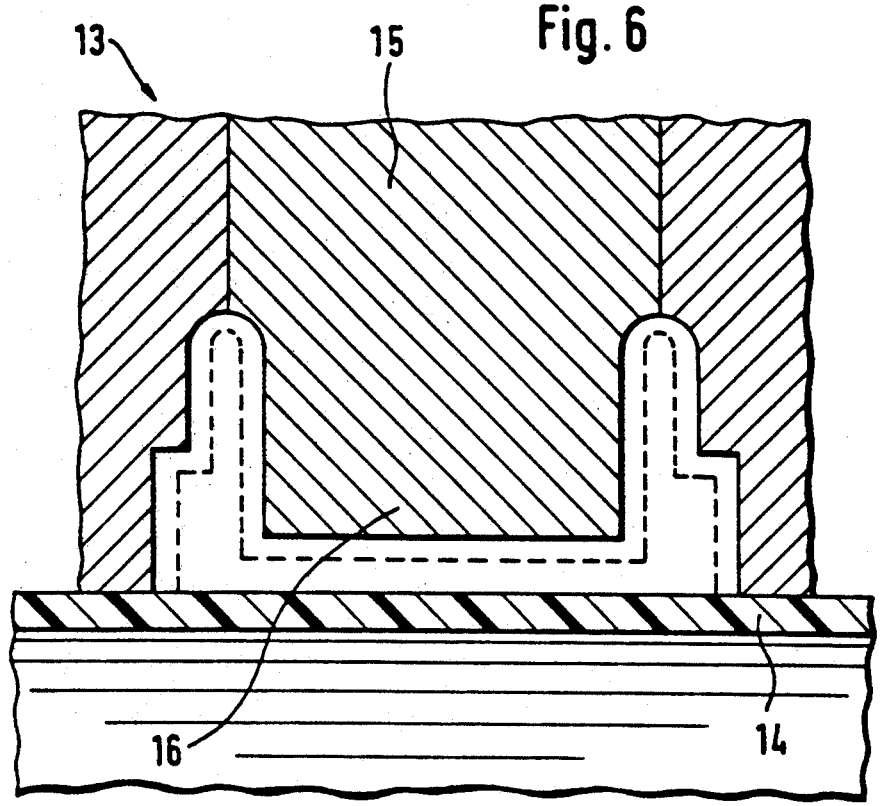
FIG. 6 is an axial section through the device along line VI—VI of FIG. 5.

FIGS. 5 and 6 show a device of the invention for the production of a cage of FIG. 1 to 3. The device is shaped as an axially symmetrical hollow mold 13 and a tube 14 made of a polymeric material is inserted coaxially into this hollow mold. In the central region, the hollow mold 13 is made up of several segment pieces 15 which are arranged along a closed circular periphery. At each of these identically shaped segment pieces 15, there is an inwardly directed projection 16 for the formation of a cage pocket. In the peripheral direction, each segment piece 15 is adjoined on both sides of the projection 16, by a shaped-surface part 17 so that between two neighboring projections 16 a shaped surface 18 for a connecting section of the cage situated between two cage pockets is formed by two shaped-surface parts 17.

In FIGS. 5 and 6, the closed position of the hollow mold 13 is represented. By inflation of the inserted tube 14 with a certain internal tube pressure, the material is pressed towards the surfaces of the projections 16 and the shaped surfaces 18 of the hollow mold 13 until it takes the shape shown by the broken line. The segment pieces 15 are radially displaceably arranged and can now be withdrawn, whereby the cage profile formed by inflating the tube 14 and subsequently cooled is removed from the mold. It can now be removed from the device with the axially adjoining tube sections 10 not deformed in the hollow mold 13.

During the inflation of the tube 14 in the hollow mold 13, for each cage pocket region the crossbar walls 4 and an extension 11 connecting the crossbar walls 4 at the inner side and closing the pocket towards the inside are formed between the connecting sections 5. By severing these extensions 11 along the separating circle 12 represented in FIG. 2, the cage of the invention is obtained.

Figure 7:
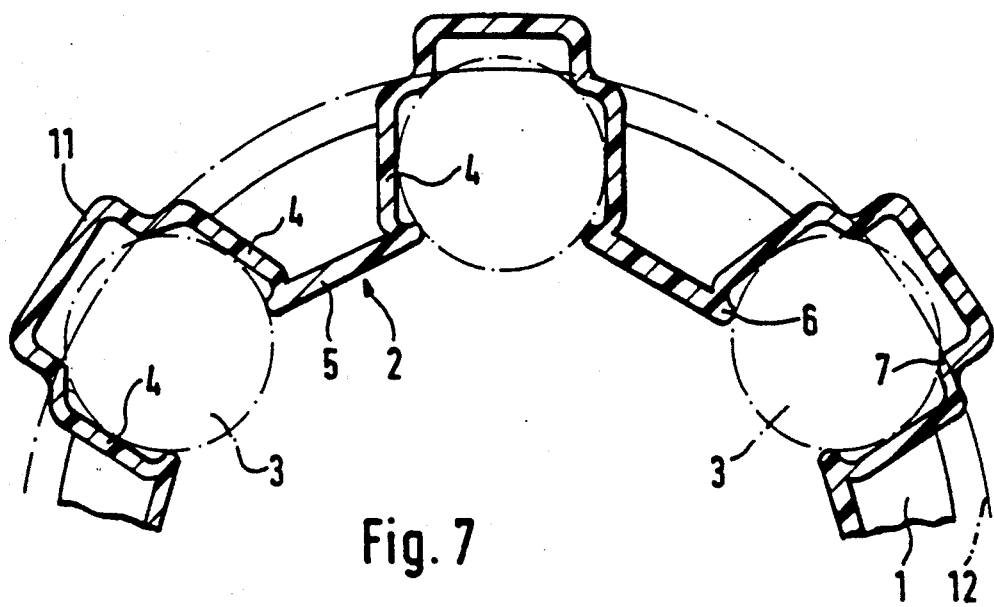
FIG. 7 is a radial section through another cage profile made by the method of the invention.

The cage profile represented in radial section in FIG. 7 differs from the cage profile of FIG. 2 only by the fact that when the tube is inflated, the extensions 11 which close the rolling element pockets are not formed on the inner but on the outer side, the crossbars 2 with their U-shape which can be seen in the axial section being open towards the outside of the cage. By the method of the invention, it is also possible to make cages with other than U-shaped crossbars e.g. with crossbars with an angular profile.

Various modifications of the method and apparatus of the invention may be made without departing from the spirit or scope thereof and it is to be understood that the invention is intended to be limited only as defined in the appended claims.

What we claim is:

1. A method for manufacturing a cage of a polymeric material for a radial rolling bearing with two end rings formed at the cage and arranged at a distance to each other in the axial direction and crossbars spaced behind one another in the peripheral direction connecting the end rings and forming pockets for receiving rolling elements, each crossbar being formed by two relatively thin-walled crossbar walls delimiting the neighboring pockets and a connecting section situated between the cross bar walls, comprising inserting a tube of the polymeric material into an open, axially symmetrical hollow mold which, for the formation of the pockets delimited by the crossbar walls and of the connecting sections, contains projections extending radially inwards and shaped surfaces extending in the peripheral direction, which surfaces are situated in case between two neighboring projections, closing the hollow mold and pressing the tube in a hot plastic condition radially into the surrounding hollow mold by inflation with a certain internal tube pressure to form a cage profile with axially adjoining, non-deformed sections of the tube and with extensions which connect the two crossbar walls of the pocket and close the same, cooling the cage profile in the hollow mold, opening the hollow mold and removing the cage profile with the non-deformed sections and the extensions from the mold and removing the non-deformed sections and the extensions from the cage profile.

2. The method of claim 1 wherein the tube is made by extrusion and inserted into the hollow mold in the hot plastic condition.

3. The method of claim 1 wherein the extensions and the tube sections are removed from the cage profile by punching, cutting or shearing.

4. The method of claim 3 wherein at the crossbar walls of the cage which delimit the pockets for the rolling elements in the peripheral direction, retaining projections for the rolling elements are formed.

5. The method of claim 1 wherein several cage profiles situated behind one another in the axial direction are formed at the same time from one tube.

* * * * *